May 26, 1931.   Y. V. CARPENTER   1,807,059
LUBRICATING SYSTEM
Filed Jan. 25, 1929   2 Sheets-Sheet 1
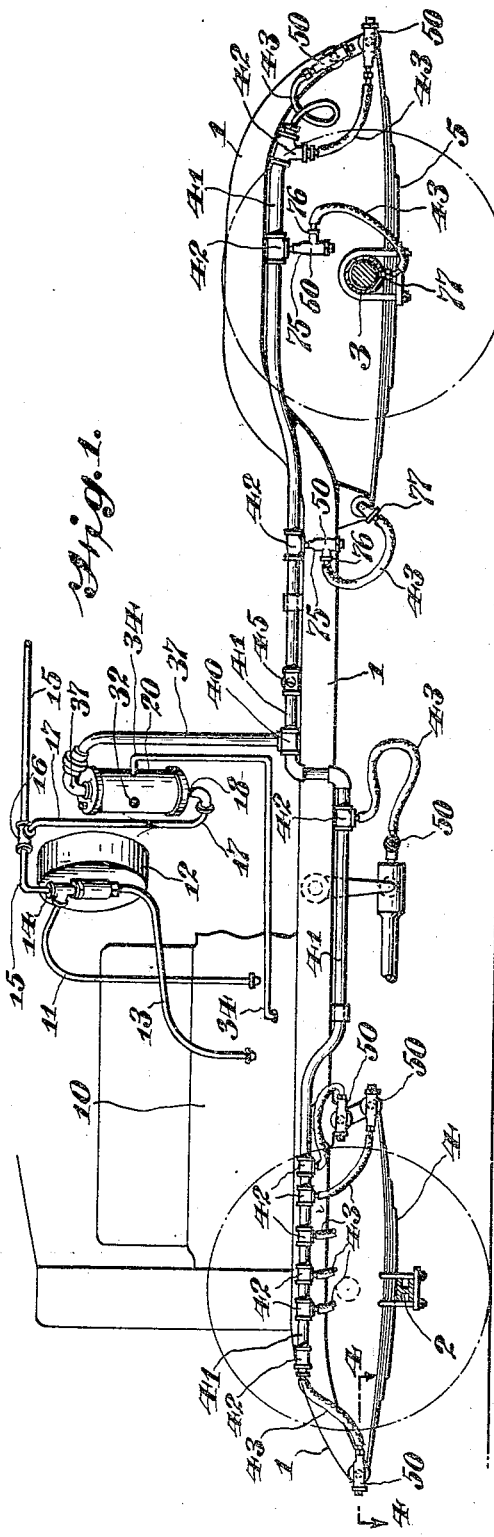
Inventor
Youel V. Carpenter,
By
Cyrus N. Anderson
Attorney

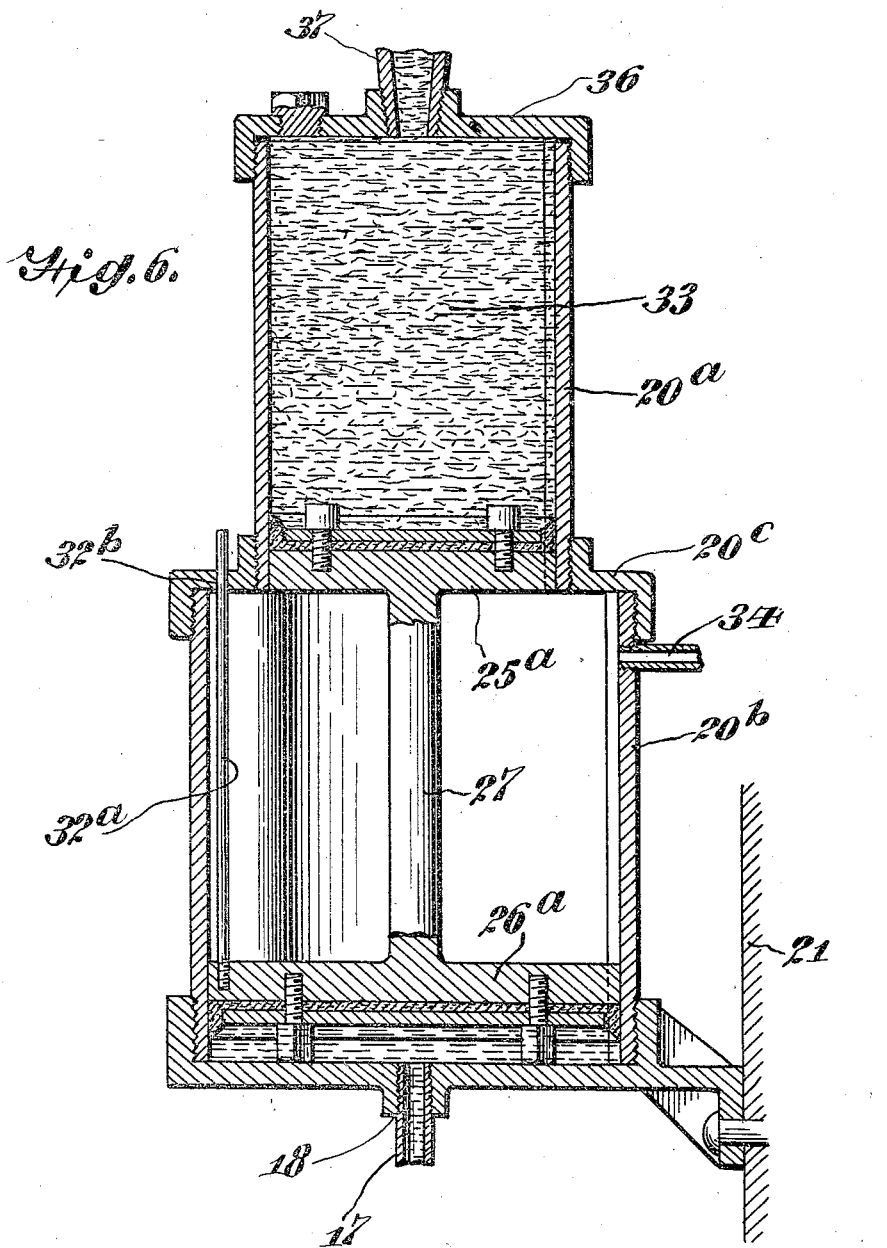

Patented May 26, 1931

1,807,059

UNITED STATES PATENT OFFICE

YOUEL V. CARPENTER, OF ESSINGTON, PENNSYLVANIA, ASSIGNOR TO IDEAL LUBRICATOR COMPANY, OF PHILADELPHIA, PENNSYLVANIA, A CORPORATION OF DELAWARE

LUBRICATING SYSTEM

Application filed January 25, 1929. Serial No. 334,912.

My invention relates to a lubricating system which is adapted to be employed in connection with a machine or other apparatus for the application of grease as a lubricant to the bearings which may be embodied in the said machine or other apparatus.

Machines and other apparatus of the character to which I refer embody means of one character or another by or from which power may be supplied for causing a distribution of the grease from a central or supply reservoir or container through a system of pipes to the bearings which it is desired to lubricate.

For the purpose of illustrating the invention I have shown an embodiment thereof as employed by me for lubricating the bearings of an automobile. In the structure embodying my invention as exemplified in the drawings I have tapped the line through which the oil travels in its circulation from and through the crank casing of the automobile, such circulation being effected in known manner by a force pump, not shown.

The general object of the invention is to provide means whereby power may be obtained from instrumentalities embodied in a machine or apparatus for causing a flow of grease through a pipe system for distributing the same to bearings embodied in the said machine or other apparatus for lubricating the same.

It also is an object of the invention to provide means whereby such power may be applied automatically to a central supply of grease contained in a reservoir or container and effect the outflow thereof through a pipe or system of pipes having connection with a bearing or bearings the lubrication of which is desired.

A further object of the invention is to provide a system of the character indicated having means whereby an instrumentality embodied in the structure of a machine or other apparatus is operative to effect outflow of grease from a reservoir or container through a pipe or system of pipes to a bearing or bearings lubrication of which is desired, and means cooperating with said first mentioned means for regulating and controlling the supply of lubricant delivered to the said bearing or bearings.

To these and other ends my invention comprehends the construction as hereinafter described in detail, particularly pointed out in the claims and as illustrated in the drawings wherein I have shown one embodiment of a system embodying the invention. However, it will be understood that the invention is susceptible of embodiment systems of other form and arrangement than that illustrated and also in connection with machines or other apparatus of a different character, construction and operation from that of an automobile, a portion of the structure of which is shown in the drawings.

In the drawings:

Fig. 1 is a view in sectional side elevation of a portion of an automobile structure showing one side of the chassis in elevation and also showing in elevation the system embodying the invention;

Fig. 2 is a view in longitudinal central section of a reservoir or container from which the lubricant of grease or equivalent material is distributed, the said figure also showing means by which the lubricant is discharged from the said container;

Fig. 3 is a view in transverse section taken on the line 3—3 of Fig. 2;

Fig. 4 is a view in longitudinal section of a bearing and of an adjoining portion of the means for supplying lubricant to the said bearing, and in elevation of a fragmentary part of the apparatus or machine upon which the bearing is supported, the said view being taken on the line 4—4 of Fig. 1;

Fig. 5 is a sectional view taken on the line 5—5 of Fig. 4, the parts being enlarged; and Fig. 6 is a view in central longitudinal section of a modified construction of grease container for the system.

In the drawings I have shown at 1 one side member of the under frame or chassis of an automobile which is supported upon the front and rear axles 2 and 3 by means of springs 4 and 5, all being of known construction and arranged and connected in known manner.

The crank case of the engine by which power is supplied to operate the automobile is indicated more or less schematically at 10. A pump (not shown) of suitable construction drives or forces the oil from the oil supply contained in the crank case through a circulatory system to lubricate the bearings of the engine structure. The oil is conducted from the said circulatory system outwardly through a pipe 11 into a filter the outline of which is indicated at 12, and from the latter through a pipe 13 back to the crank case. The circulation of the oil through the crank case and through the circulatory system including the pipes 11 and 13 and the filter 12 is or should be continuous during the operation of the engine. The pipes 11 and 13 and the filter 12 are parts of known construction and further description thereof is deemed to be unnecessary. The pipe 11 through which the oil flows to the filter 12 is tapped as indicated at 14 by a pipe 15 which is connected to the oil gage (not shown) upon the instrument board of the automobile which is visible to the person who may be driving the car. The pipe 15 is tapped as indicated at 16 by a pipe 17 the opposite end of which is connected as indicated at 18 with the lower end of a container 20 which is mounted upon the front side of the dash-board of the car indicated at 21. In the construction as actually employed by me the container is mounted upon the front end (the dash-board) of the body portion of the car underneath the rear end of the upper side of the hood of the car.

The container may be of cylindrical form as shown and is provided with a piston or plunger comprising two heads 25 and 26 which are spaced from each other as shown and are connected to move as a unit by a connecting rod 27. A bar 30, which may be of practically rectangular shape in cross section as illustrated, is mounted upon the connecting rod 27 and its outer edge is located in proximity to the inner surface of the cylindrical container 20, in front of a peep-sight opening 31. A gage is provided upon the outer edge of the said bar as indicated at 32 which is adapted to indicate by its position the amount of lubricant 33 in the container above the head 25 of the piston or plunger which operates in the said container.

Instead of a container having the construction of the container 20, which is of the same interior diameter from top to bottom, a container of the construction shown in Fig. 6 of the drawings may be employed in and as a part of the system. The said container comprises upper and lower sections $20^a$ and $20^b$ having different internal diameters, the internal diameter of the section $20^b$ being greater than that of the section $20^a$. These two sections are united by a coupling $20^c$ having screw threaded connection with the exterior lower end portion of the section $20^a$ and with the exterior upper end portion of the section $20^b$. The piston or plunger comprises two heads $25^a$ and $26^a$, the former being of smaller diameter than the latter and operating in the section $20^a$. The head $26^a$ operates in the section $20^b$. The operation of the piston or plunger in the system as illustrated is effected by means of oil supplied from the crank case of the automobile through the pipe 17.

For the purpose of indicating the amount of lubricant which may be present in the section $20^a$ as the plunger or piston moves upwardly to effect discharge of the same I have provided a gage rod or bar $32^a$ which is mounted upon the head $26^a$ of the said piston or plunger and extends upwardly through an opening $32^b$ provided in the horizontal or transversely extending portion of the coupling $20^c$. When the piston or plunger occupies its lowermost position as shown in the drawings the upper end thereof occupies a plane coincident with the plane of the bottom of the lubricant 33 in the section $20^a$; or otherwise described, the upper or outer end of the gage rod $32^a$ may be stated to be in the plane of the upper side of the head $25^a$. As the piston or plunger moves upwardly to force the lubricant from the section $20^a$ the gage rod 32 likewise moves upwardly and its upper end remains at all times in the plane of the bottom of the lubricant. It will be apparent, therefore, that the gage rod $32^a$ provides means whereby the amount of lubricant in the section $20^a$ may be ascertained at any moment.

The operation of the piston or plunger comprising the heads $25^a$ and $26^a$ to effect discharge of the lubricant 33 from the section $20^a$ is effected, in the construction illustrated, by means of oil supplied under pressure through a pipe 17 to the bottom of the section $20^b$ from the outlet side of the circulatory system previously referred to through which oil is caused to flow or circulate by means of a pump in known manner from the crank case of the engine and thence back to the said case. By using a head $26^a$ of greater diameter than the head $25^a$ and of greater diameter than the internal diameter of the section $20^a$ I have provided means whereby greater pressure per unit area transversely of the lubricant 33 may be applied than is applied by the pressure of the fluid from the pipe 17 to each unit of area of the under or outer side of the head $26^a$ of the piston or plunger. In other words, I have provided means whereby the pressure under which the fluid is supplied through the pipe 17 may be caused to exert substantially greater pressure per unit area upon the lubricant to effect discharge thereof than is exerted per unit area against the bottom or outer side of the head $26^a$ of the piston or plunger. In that way and by that means the pressure exerted to cause flow of the grease lubricant or its equivalent through the pipes of the system may be substantially increased.

For the purpose of removing from the container 20 or the section 20ᵇ any liquid such as oil or the like which may enter the space between the heads 25 and 26 or the heads 25ᵃ and 26ᵃ of the piston or plunger I have provided a drain pipe 34 which is in communication with the interior of the container 20 or the section 20ᵇ as shown in Fig. 2 and in Fig. 6 of the drawings. The said pipe 34 preferably should be connected with the crank case of the engine as shown in Fig. 1. The outer or discharge end 36 of the container 20 and of the section 20ᵃ are each provided with an opening within which an end of the pipe 37 is secured, through which pipe the lubricant 33, which as indicated may consist of grease or its equivalent, is discharged. The end of the said pipe opposite its connection to the end 36 of the container 20 or of the section 20ᵃ is connected as indicated at 40 to a pipe 41 which may be described as a manifold. Various outlets 42 are provided upon the manifold pipe 41 which outlets are connected by flexible pipes 43 to the respective bearings which are embodied in the apparatus. The manifold pipe 41 which is shown is located at one side of the chassis. Another manifold pipe, not shown, preferably is provided upon the opposite side of the chassis structure from that shown and grease may be supplied thereto through a branch pipe 45, indicated in dotted lines, which may extend from the manifold pipe 41 cross-wise of the car and be connected to the other manifold which, as stated, is not shown.

In Fig. 4 of the drawings I have shown a bearing indicated as a whole at 50 to which the lubricant is supplied from a flexible pipe 43. The outer end of the latter is connected to one end of a nipple 51 as shown. The opposite screw threaded end of the nipple is in engagement with a screw threaded end portion 53 of a tubular casing 54. The end of the tubular casing 54 adjoining the screw threaded end of the nipple 51 is partially closed so as to provide a small inlet opening 55 through which the lubricant is adapted to pass from the nipple and from the flexible pipe or hose 43 into the said casing. The outer or opposite end of the casing 54 is screw threaded as indicated at 56 for engagement with the outer screw threaded end portion of a regulating plug 57. The inner substantially half portion of the said plug 57 is provided with a helix 60 which is located within the smooth interior portion 61 of the tubular casing 54. The outer edge of the said helix fits closely against the surface 61 so as to prevent the passage of lubricant between the said edge and the surface 61 of the casing 54. The presence of the helix 60 provides a helical groove 62 through which the lubricant flows after it has passed from the nipple 51 into the casing. From the groove 62 the lubricant is discharged into an outlet passage 63 which extends from the casing 54 through a nipple 64 which projects laterally from said casing. The said nipple is screw threaded and is in engagement with a screw threaded opening 65 provided in the adjoining outer end of a pivot bolt 66 constituting a part of the bearing structure 50. The bolt 66 is provided with an axial passageways 67 which constitutes a continuation of the outlet passageway 63. The inner end of the passageway 67 is connected with a laterally extending opening 70 which opens into an annular groove 71 provided in the pivot bolt 66. The grease is distributed from the annular groove 71 through the bearing structure whereby lubrication of the latter is effected.

The helical groove 62, being of relatively small cross section, retards or offers resistance to the flow of the lubricant through the tubular casing 54. By adjusting the plug 57 inwardly or outwardly the resistance to such flow is increased or diminished. By adjusting the same inwardly the length of the said groove through which the lubricant must pass is increased and in consequence the resistance to the flow is increased. By such adjustments the quantity of lubricant supplied to the bearing may be controlled and varied. The plug may be locked in any position to which it may be adjusted by means of a lock nut 72.

In some cases, as indicated at 75, the lubricant-controlling devices are connected respectively to the outlet pipes or nipples 42 and the inner ends of the flexible pipes or hose 43 are connected to nipples 76 which project laterally from the casings of said controlling devices, and the opposite ends of the said flexible pipes or hose are connected to nipples 77 which have connection with the bearings. This arrangement differs from that previously described in connection with Figs. 4 and 5 and as shown at other points in the drawings only in that the devices for controlling the flow of lubricant to the bearings are located at different points between the manifold pipe 41 and the bearings. The operation, whether the devices be located at one point or another, is identical.

It will be noted that the pipe 17 by which the oil is supplied to the container for operating the piston therein to expel the grease or other equivalent lubricant therefrom is connected with the pipe 11 connected with the outlet or power side of the pump by which oil is taken from the crank shaft casing and forced through the circulatory system and to and through the filter 12. It will be apparent that by thus obtaining power for forcing the grease lubricant through the lubricating system no additional expense in operation is involved. The system of pipes and the control devices above referred to once having been installed or mounted upon the structure of the machine or other apparatus, not only is there no further unusual or added expense involved, but on the contrary substantial economy in operation may be effected. Such economy is due to the fact that by means of the devices for regulating and controlling the flow of grease lubricant or other equivalent lubricant to the bearings only that amount need be supplied as is necessary to effect sufficient and desired lubrication of the bearings. Practice has shown that the bearings at all times are in a proper state of lubrication. There is at all times a sufficient amount of lubricant present to protect the contacting portions of the bearings from unnecessary wear. Furthermore, a system of lubrication embodying my invention is of great advantage in that because the bearings are at all times well and properly lubricated they may be readily taken apart for the purpose of repair or for any other purpose.

Although I have illustrated the lubricating system as being connected with the outlet or power side of the pump (and not to the return side thereof) so that the piston within the container is directly driven by the application of oil under pressure to one side thereof, it will be understood that if the machine or other apparatus includes an instrumentality which during the operation of such machine or apparatus results in the creation of a vacuum or partial vacuum, advantage may be taken of such vacuum or partial vacuum to effect operation of the piston within the casing of the container to force therefrom the lubricant 33 through the pipe 37. That such operation of the piston within the casing of the said container 20 may be effected by taking advantage of forces resulting from the presence of a vacuum produced during the operation of the machine or other apparatus will be obvious to those skilled in the art.

It will be seen that by my invention I have provided a system whereby the forces produced in the normal operation of a machine or other apparatus are employed, without affecting such normal operation, to cause the flow of a grease lubricant or an equivalent lubricant through a distributing system having connection with an indefinite number of bearings the lubrication of which is required.

The words "grease lubricant" employed in the specification and claims is intended to comprehend not only a lubricant of grease but any other suitable lubricant.

Having thus described my invention, what I claim and desire to secure by Letters Patent is:

1. A system of lubrication for lubricating the bearings of an automobile or other like vehicle, which automobile or other like vehicle includes means for causing oil to flow continuously from the crank case of the engine thereof through a circulatory system provided in the engine structure and back to the said crank case, the said lubricating system comprising a central container for holding grease, a system of pipes having connection with the said container and also having connection with the bearings to be lubricated, the said pipes including devices for regulating and controlling the flow of grease to the said bearings, a plunger located in the said container, and a pipe connection between the said container and the outlet side of the oil circulatory system of the engine through which oil is conveyed to the said container under pressure during the operation of the said engine and maintained under pressure for causing movement of the plunger within the said container for causing discharge of the grease therefrom into the said system of pipes by which it is conveyed to the said bearings.

2. A system of lubrication for lubricating the bearings of an automobile or other like vehicle, the said automobile including means for causing a circulation of oil from the crank case of the engine through a circulatory system provided in the engine of the automobile for supplying continuous lubrication to the bearings of said engine, the said circulatory system having connection with an oil filter from which a return pipe extends to the said crank case, the said lubricating system comprising a container for holding grease, a manifold pipe having connection with the said container, branch pipes having connection with the said manifold pipe and with the bearings of the automobile to be lubricated, the said branch pipes including devices intermediate their points of connection with the said manifold pipe and the said bearings for regulating and controlling the flow of grease therethrough to the said bearings, a plunger located in the said container, and a pipe connection between the said container and the pipe leading to the said filter through which oil is supplied to the said container and maintained therein under continuous pressure during the operation of the engine of the automobile to cause movement of the plunger in the said container to effect discharge of the grease therefrom into the manifold pipe from which it is distributed through said branch pipes to the said bearings.

3. A system of lubrication for lubricating the bearings of an automobile or other machine, which automobile or other machine includes means for causing oil to flow continuously from the crank case of the engine of such automobile or other machine through a circulatory system provided in the engine structure and back to the said crank case, the said system comprising a container for holding grease, a system of pipes having connection with the said container and also having connection with the bearings to be lubricated, a plunger located in the said container, and a pipe connection between the said container and the outlet side of the oil circulatory system of the engine through which oil is conveyed to the said container under pressure during the operation of the said engine and maintained under pressure for causing movement of the plunger within the said container for causing discharge of the grease therefrom into the said system of pipes by which it is conveyed to the said bearings.

4. Means for lubricating the bearings of an automobile or other machine, which automobile or other machine includes means for causing oil to flow continuously from the crank case of the engine thereof through a circulatory system provided in the engine structure and back to the said crank case, the said lubricating means comprising a container for holding grease, a pipe having connection with the said container and also having connection with one or more bearings to be lubricated, a plunger located in said container, and a pipe connection between the said container and the outlet side of the oil circulatory system of the engine through which oil is conveyed to the said container under pressure during the operation of the said engine and maintained under pressure for causing movement of the plunger within the said container for causing discharge of the grease therefrom into the said pipe through which it is conveyed to the said bearing or bearings.

In testimony that I claim the foregoing as my invention I have hereunto signed my name this twenty-third day of January, 1929.

YOUEL V. CARPENTER.